US008264754B2

(12) United States Patent
Harada

(10) Patent No.: US 8,264,754 B2
(45) Date of Patent: Sep. 11, 2012

(54) DOCUMENT FEEDING DEVICE, IMAGE READING DEVICE AND IMAGE FORMING DEVICE EQUIPPED WITH SAME

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 506 days.

(21) Appl. No.: 12/556,953

(22) Filed: Sep. 10, 2009

(65) Prior Publication Data

US 2010/0060956 A1 Mar. 11, 2010

(30) Foreign Application Priority Data

Sep. 10, 2008 (JP) ................................ 2008-232611

(51) Int. Cl.
*H04N 1/04* (2006.01)

(52) U.S. Cl. ......... 358/498; 358/474; 358/475; 358/496

(52) U.S. Cl. ................................................................

(58) Field of Classification Search .................. 358/498, 358/474, 475, 496, 497
See application file for complete search history.

(56) References Cited

U.S. PATENT DOCUMENTS

| | | | | |
|---|---|---|---|---|
| 5,313,253 | A * | 5/1994 | Martin et al. | 399/16 |
| 5,528,347 | A * | 6/1996 | Kamath et al. | 399/18 |
| 2007/0237530 | A1* | 10/2007 | Sunada | 399/21 |
| 2010/0002266 | A1* | 1/2010 | Takahashi et al. | 358/3.06 |

FOREIGN PATENT DOCUMENTS

| | | | |
|---|---|---|---|
| JP | 9-244321 | | 9/1997 |
| JP | 2005-269093 | * | 9/2005 |
| JP | 2007065395 | | 3/2007 |
| JP | 2008-184296 | | 8/2008 |

* cited by examiner

*Primary Examiner* — Houshang Safaipour

(74) *Attorney, Agent, or Firm* — Gerald E. Hespos; Michael J. Porco

(57) ABSTRACT

A document feeding device includes: a document tray on which a document is loaded; a discharge tray to which the original document is discharged; a conveyance path which conveys a document on the original document tray to the discharge tray via a document reading position; a detection unit which is disposed in the conveyance path and detects a jam of the original document in the conveyance path; and an illumination device which illuminates the conveyance path in a state visible from the exterior when the detection unit has detected a jam of the original document.

10 Claims, 7 Drawing Sheets

DOCUMENT FEEDING DEVICE, IMAGE READING DEVICE AND IMAGE FORMING DEVICE EQUIPPED WITH SAME

BACKGROUND OF THE INVENTION

1. Field of the Invention

The present invention relates to a document feeding device for conveying a document to a predetermined image reading position, an image reading device and an image forming device equipped with same.

2. Description of the Related Art

An image forming device which forms an image on paper on the basis of an original document image includes a device main body which carries out image formation, a document feeding device and an image reading unit. An original document set in the original document tray of the document feeding device is conveyed toward an image reading position of the image reading unit and the image surface of the document is read in. Thereupon, in an image forming device using an electrophotographic process, a photosensitive drum is previously charged and an electrostatic latent image is formed on the surface of this drum by irradiating laser light modulated in accordance with the image data of the original document image. Thereupon, the developed toner image is transferred to paper and fixed.

In the reading of an original document described above, the original document which has been conveyed from the original document tray is sent out to an discharge tray of the document feeding device, but if this original document becomes jammed inside the device during movement, then the device halts operation until the paper jam is resolved. Therefore, technology is known according to which an illumination device which shines onto the closest position to the position of the paper jam is provided, thereby facilitating the processing of jams.

However, in the prior art technology described above, there is a problem in that it is not possible to alert a user immediately to the occurrence of a paper jam. This is because the illumination device according to this technology does not light up at the moment that the paper jam occurs, but rather at the start of the subsequent jam processing. Furthermore, the illumination device does not light up unless the cover provided in the document feeding device is opened, and hence there remains a problem in that a paper jam situation may be left unattended for a long period of time.

SUMMARY OF THE INVENTION

The object of the present invention is to provide a document feeding device, an image reading device and an image forming device equipped with same, whereby the occurrence of a paper jam can be reported immediately and a paper jam situation is not liable to be left unattended.

The document feeding device relating to one aspect of the present invention which achieves this object includes: an original document tray on which an original document is loaded; a discharge tray to which the original document is discharged; a conveyance path for conveying an original document on the original document tray to the discharge tray via an original document reading position; a detection unit which is disposed in the conveyance path and detects a jam of the original document in the conveyance path; and an illumination device which illuminates the conveyance path in a state visible from the exterior, when the detection unit has detected a jam of the original document.

The image reading device relating to a further aspect of the present invention includes: an image reading unit including a contact glass disposed on an original document reading position and a housing which holds this contact glass; and a document feeding device which is disposed above the image reading unit and feeds an original document to the contact glass; the document feeding device having the composition described above.

The image forming device relating to yet a further aspect of the present invention includes: an image reading device which reads in an original document image; and a device main body which has an image forming unit that forms an image on sheet on the basis of original document image data read in by the image reading device, and which supports the image reading device. The image reading device includes: an image reading unit including a contact glass disposed on an original document reading position and a housing which holds this contact glass; and a document feeding device which is disposed above the image reading unit and feeds an original document to the contact glass; the document feeding device having the composition described above.

DETAILED DESCRIPTION OF THE PREFERRED EMBODIMENTS

Figure 1:
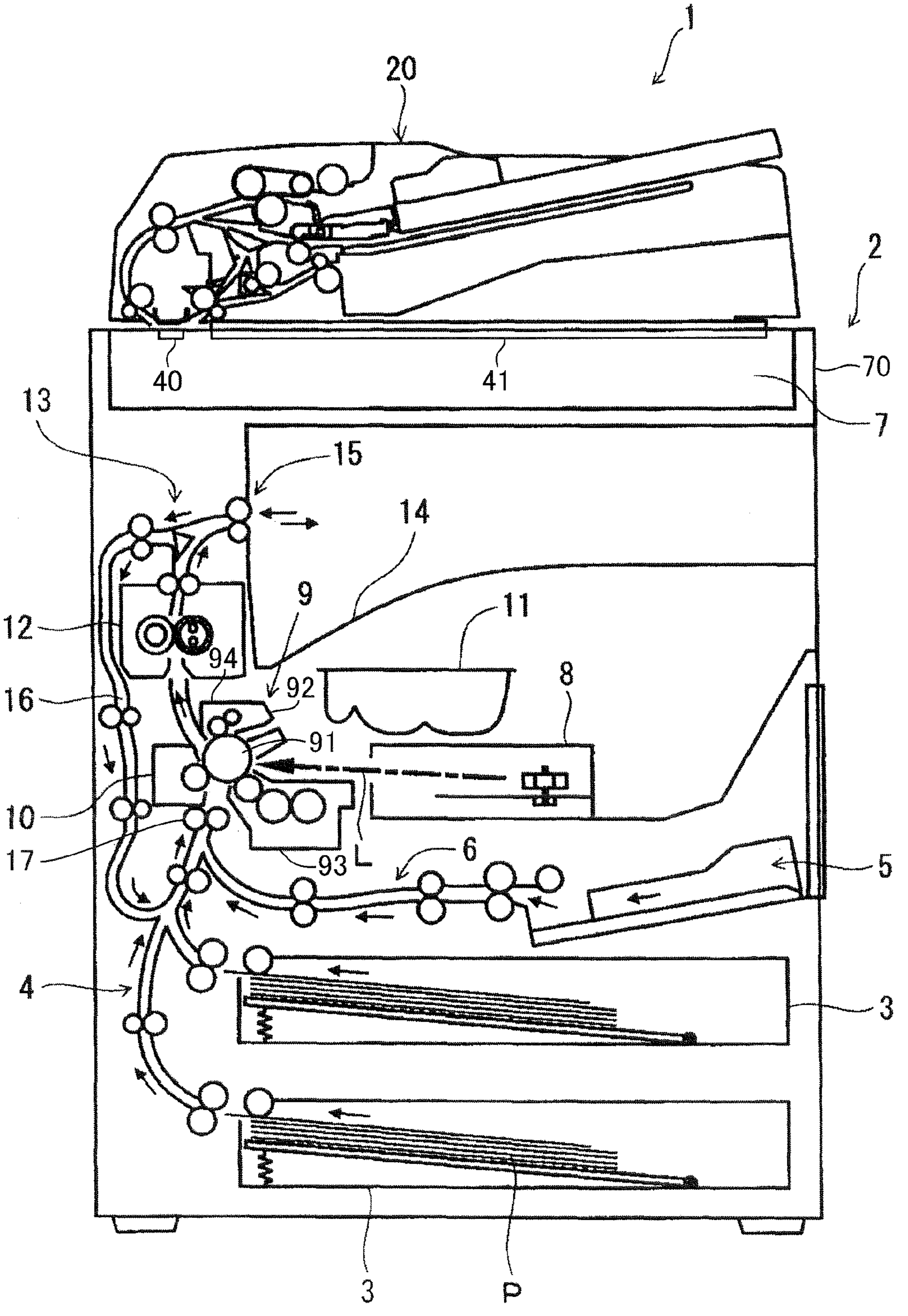
FIG. 1 is a cross-sectional front view diagram showing an approximate view of a complex machine (image forming device) to which the document feeding device according to the present invention is applied.

Below, an embodiment of the present invention will be described with reference to the drawings. FIG. 1 shows a cross-sectional view of a complex machine 1 which is one example of an image forming device, as viewed from the front side. The complex machine 1 according to the present embodiment includes: a device main body 2 having an image forming unit 9 which forms an image on paper; an image reading unit 7 which is disposed in the upper portion of the device main body 2; and a document feeding device 20 which is mounted on the upper surface of the device main body 2, in other words, on the upper side of the image reading unit 7. The complex machine 1 is an inner discharging type of device which has a paper discharge tray 14 formed on the lower side of the image reading unit 7.

The document feeding device 20 is a document feeding device (ADF: Auto Document Feeder) which is composed so as to automatically convey an original document to a predetermined image reading position. In more detail, when the complex machine 1 is used as a copying machine, a facsimile device or a network scanner, an original document is conveyed from the document feeding device 20, and the image surface of the original document is read in optically by the image reading unit 7.

A front loading type of paper supply device is disposed in the lower portion of the device main body 2. More specifically, a two-tier paper supply cassette 3 is provided following the height direction of the device main body 2. The respective paper supply cassettes 3 are each detachable with respect to the device main body 2, and when pulled out toward the front side of the complex machine 1, the interior of the paper supply cassette 3 is opened to the exterior, whereas when pushed in toward the rear surface side of the complex machine 1, the interior of the paper supply cassette 3 is closed.

The arrow indicated by the solid line in FIG. 1 represents the conveyance path and the conveyance direction of the paper P. The respective paper supply cassettes 3 accommodate paper P of various types before image formation, in a stacked state, and this paper P is separated from the cassette 3, one sheet at a time, and conveyed in the leftward direction. The paper P is conveyed upwards via a conveyance path 4 provided following the left-side surface of the device main body 2.

Furthermore, an openable and closable manual feed tray 5 is provided on the right-side surface of the device main body 2. Paper fed out from the manual feed tray 5 is conveyed via a conveyance path 6 and is then conveyed upwards via the conveyance path 4.

A resist roller 17, an image forming unit 9 and a transfer unit 10 are provided in sequence inside the device main body 2 on the downstream side in terms of the paper conveyance direction in the conveyance path 4. The image forming unit 9 includes a photosensitive drum 91 on the circumferential surface of which an electrostatic image and toner image are formed; a charging unit 92 which applies a uniform electric charge to the circumferential surface of the photosensitive drum 91; a developing unit 93 which develops the electrostatic image by supplying toner to the circumferential surface of the photosensitive drum 91; and a cleaning unit 94 which cleans the circumferential surface of the photosensitive drum 91 after the toner image has been transferred.

A light exposure unit 8 and a toner container 11 are provided on the right-hand side of the image forming unit 9. The light exposure unit 8 includes a laser light source and a polygonal mirror, and irradiates laser light L that has been modulated in accordance with the image data of the original document image read in by the image reading unit 7, onto the photosensitive drum 91 of the image forming unit 9. The toner container 11 replenishes toner to the developing unit 93. The transfer unit 10 includes a transfer roller which forms a transfer nip section by abutting against the photosensitive drum 91 and transfers the toner image formed on the circumferential surface of the photosensitive drum 91 onto the paper P which passes through the transfer nip section.

A fixing unit 12 and a branching section 13 are provided in sequence on the downstream side of the transfer unit 10 in terms of the paper conveyance direction. The fixing unit 12 fixes the toner image to the paper P by applying heat and pressure to the paper P onto which the toner image has been transferred, and includes a fixing roller and a pressurizing roller which form a fixing nip section. The paper P onto which the toner image has been transferred is heated and pressurized by passing through this fixing nip section.

A double-side printing unit 16 is provided on the left-hand side of the conveyance path 4. One end of the double-side printing unit 16 contacts the downstream side of the fixing unit 12 in the conveyance path 4, and the other end includes a reverse conveyance path which is connected to the upstream side of the image forming unit 9. When performing single-side printing onto the paper P, the paper P discharging from the fixing unit 12 is sent to the discharge tray 14 via the discharge roller 15. On the other hand, when performing double-side printing onto the paper P, once the paper P has been discharged toward the paper discharge tray 14, the paper P is then switched back toward the reverse conveyance path of the double-side printing unit 16 by driving the discharge roller 15 in reverse, thereby returning the paper P to the upstream side of the image forming unit 9 in the conveyance path 4, and the paper P is then conveyed toward the image forming unit 9 again.

The image reading unit 7 includes a frame body 70 having an opening section in the upper surface thereof, and a light source, an imaging element and an optical system (not illustrated) which are provided inside this frame body 70. The light source is mounted on a moving frame and irradiates light onto the original document. The imaging element consists of a CCD (Charge Coupled Device), or the like, and receives the light reflected from the original document, converting same into an electrical signal. The optical system includes a mirror and a lens and directs the reflected light onto the imaging element. A first contact glass 40 (contact glass as claimed) which opposes the original document when the original document is read automatically by the document feeding device 20, and second contact glass 41 for manual positioning and reading on which the original document is positioned manually are fitted into the upper surface opening section of the frame body 70.

Figure 2:
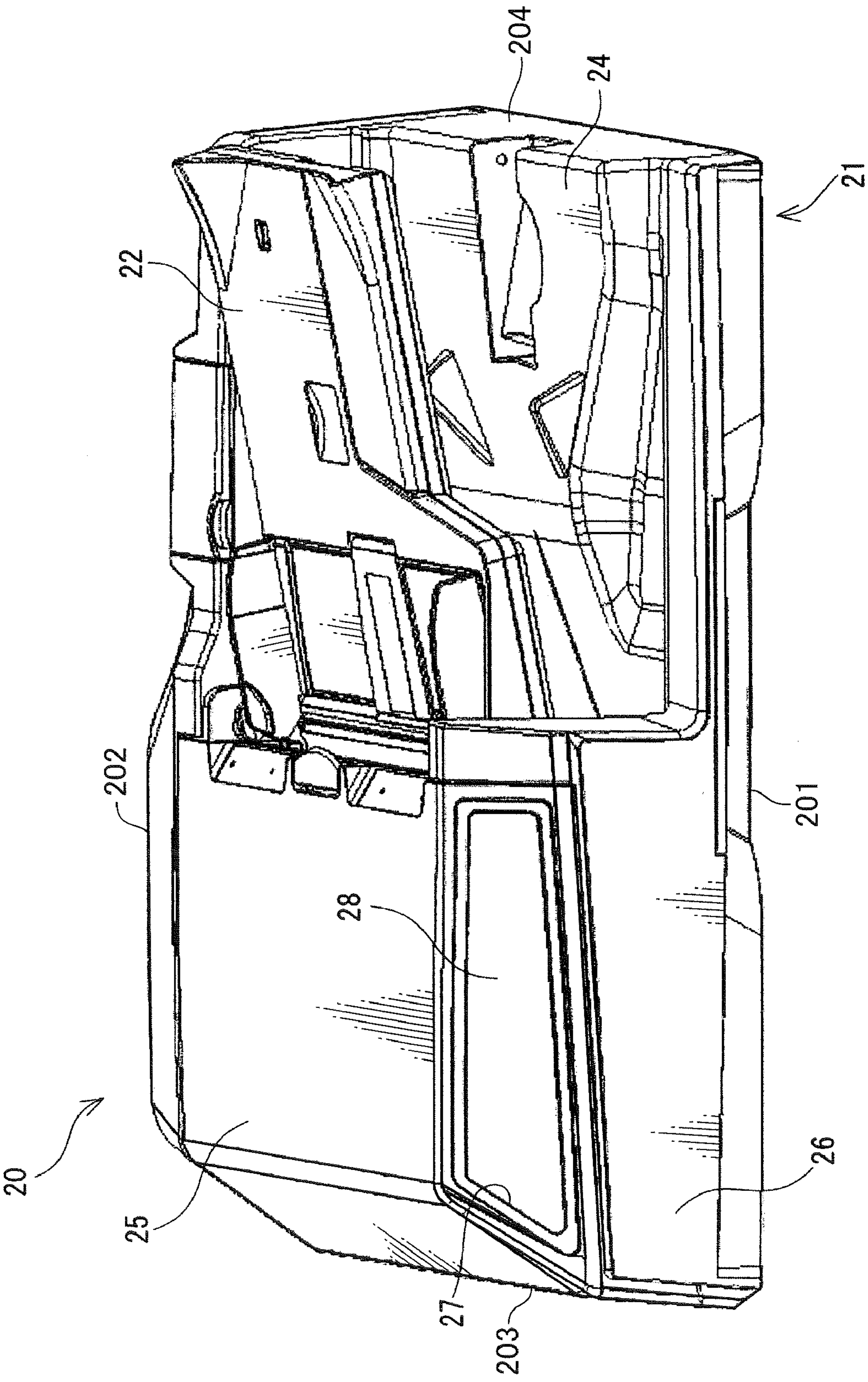
FIG. 2 is a perspective diagram of a document feeding device.

FIG. 2 is a perspective diagram of the document feeding device 20. The document feeding device 20 includes a feeding device main body 21 (housing), an original document tray 22 on which original document images for automatic reading are loaded, and a discharge tray 24 into which original documents are discharged. The feeding device main body 21 has an original document automatic conveyance function for discharging an original document on the original document tray 22 via the first contact glass 40 which is the original document image reading position, to the discharge tray 24.

The original document tray 22 extends obliquely in the upward and rightward direction from the central portion of the feeding device main body 21. The original document tray 22 is installed rotatably on the feeding device main body 21 in this central portion. An original document which is read automatically at the position of the first contact glass 40 of the image reading unit 7 is set in position on top of this original document tray 22. The discharge tray 24 is disposed on the rear surface side (lower side) of the original document tray 22.

The document feeding device 20 has a flat rectangular parallelepiped shape in broad terms, and includes a front side edge 201 which is disposed on the front side (the side facing the user), a rear side edge 202 which is opposite to the front side edge 201, and a left-side edge 203 and a right-side edge 204 which are perpendicular to these side edges. The document feeding device 20 is supported rotatably with respect to the frame body 70 of the image reading unit 7 on the rear side edge 202, and the attitude thereof can be changed between an open attitude where the upper surface of the frame body 70 is open and a closed attitude where the upper surface of the frame body 70 is closed.

A projecting section 26 which projects toward the front side is provided on the left-side portion of the front side edge 201. To change the document feeding device 20 from the closed attitude to the open attitude, the user places his or her hand against the lower surface of the projecting section 26 and lifts upwards.

Figure 3:
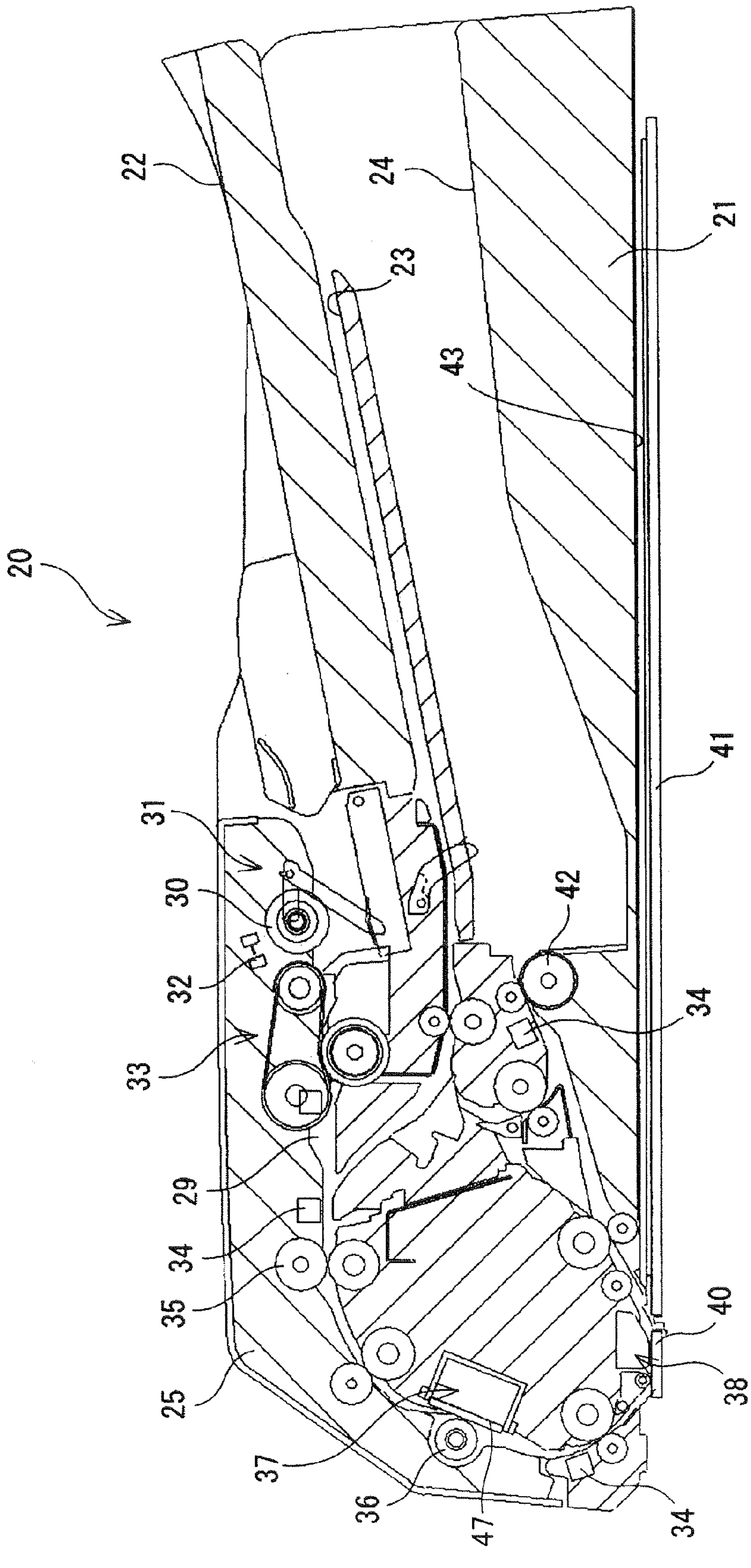
FIG. 3 is a cross-sectional front view diagram of a document feeding device.

The feeding device main body 21 includes a conveyance path 29 for conveying an original document on the original document tray 22 to the discharge tray 24 via the first contact glass 40 (document reading position), and a paper supply cover 25 (conveyance guide) located on the left-hand side of the original document tray 22 (FIG. 2 and FIG. 3). This paper supply cover 25 is supported rotatably on the feeding device main body 21 on the left-hand end in the diagram and enables the conveyance path 29 to be opened and closed to the exterior. In other words, when in the state depicted in the drawings, the paper supply cover 25 closes the conveyance path 29 and the external surface of the paper supply cover 25 corresponds to the top surface of the document feeding device 20, while the inner surface of the paper supply cover 25 functions as a guide of the conveyance path 29.

In this case, if the paper supply cover 25 is separated from the original document tray 22 and rotated in the counter-clockwise direction in FIGS. 2 and 3, then the conveyance path 29 is opened and the various types of rollers disposed about the periphery of the conveyance path 29 can be exposed. More specifically, in the conveyance path 29, a pick-up roller 30, a pair of separating rollers 33 and a resist roller 35 are disposed in sequence in terms of the direction of conveyance of the original document from the original document tray 22.

The pick-up roller 30 is located in the paper supply cover 25 (FIG. 3) and makes contact with the original document disposed in the uppermost layer of the original document tray 22, thereby supplying the original document toward the pair of separating rollers 33. The presence or absence of conveyance of an original document is detected by the setting switch 31 and the orientation of the original document, and the like, is detected by the position sensor 32. The setting switch 31 and position sensor 32 are also situated in the paper supply cover 25.

The pair of separating rollers 33 are provided respectively in the paper supply cover 25 and the conveyance device main body 21, and the original document is conveyed one sheet at a time toward the resist roller 35 at a prescribed conveyance pressure, and is conveyed to a contact image sensor (CIS) 37. The contact image sensor 37 is disposed in the feeding device main body 21 in the vicinity of the rotational fulcrum of the paper supply cover 25, and reads in the lower surface of the original document, in other words, the surface which directly faces the original document tray 22, by operating in conjunction with the read roller 36.

A paper supply guide 38, a discharge roller 42 and a discharge tray 24 are disposed in sequence on the downstream side of the contact image sensor 37 in view of the original document feed direction. The paper supply guide 38 is disposed in the feeding device main body 21 facing the first contact glass 40 of the image reading unit 7 which is disposed in the vicinity of the rotational fulcrum of the paper supply cover 25. The original document is conveyed between the paper supply guide 38 and the first contact glass 40, and during this, the image on the upper surface of the original document, in other words, the surface on the opposite side to the surface read in by the contact image sensor 37 is read in by the CCD via an optical system consisting of a mirror, lens, and the like, inside the image reading unit 7. The original document of which the image surface has been read is discharged to the discharge tray 24 via the discharge roller 42.

Apart from simultaneously reading the front and rear surfaces of the original document as described above, it is also possible to read the image on one surface at a time, by using a inverting tray 23 which is disposed between the trays 22 and 24. In this case, when the upper surface of the original document has been read in at the position of the first contact glass 40, the document is sent toward the inverting tray 23 which is disposed obliquely above and to the right in FIG. 3, where the upper surface arrives in a state of directly facing the inverting tray 23. Thereupon, when the original document in the inverting tray 23 is switched back to the conveyance path 29 and supplied obliquely upwards and rightwards in terms of the drawing, the lower surface of the document is read in at the position of the first contact glass 40.

The document feeding device 20 according to the present embodiment also functions as a document press. The document feeding device 20 is supported rotatably on the device main body 2 via a hinge unit (not shown) on the rear surface side of the complex machine 1, on the side of the rear side edge 202. By this means, the document feeding device 20 is able to open and close with respect to the image reading unit 7. Furthermore, a pressing plate 43 is provided on the lower surface of the feeding device main body 21. This pressing plate 43 opposes the second contact glass 41 for manual positioning and reading and presses the original document which is positioned on this second contact glass 41.

When the user is to set an original document on the second contact glass 41 for manual positioning and reading, he or she grasps the projecting section 26, sets the document feeding device 20 to an open attitude and exposes the second contact glass 41. Thereupon, the user positions the original document on the second contact glass 41 and then sets the document feeding device 20 to a closed attitude. Thereupon, by pressing an operating button (not illustrated), the image surface of the document is read in by the image reading unit 7.

Furthermore, a plurality of detection sensors 34 (detection units) which detect jamming of the original document in the conveyance path are disposed in the conveyance path 29 described above. In the present embodiment, as shown in FIG. 3, detection sensors 34 are provided respectively between the pair of separating rollers 33 and the resist roller 35, between the contact image sensor 37 and the paper supply guide 38 and also between the paper supply guide 38 and the discharge roller 42. When the respective detection sensors 34 detect a jam of the original document at their respective locations, they send a detection signal to the controller 371 (see FIG. 7).

As described further below, the controller 371 outputs a drive signal to the contact image sensor 37 (illumination device) on the basis of a document jam detection signal, separately from the reading of the original document. Accordingly, the contact image sensor 37 lights up immediately and continuously illuminates the conveyance path 29 in a state that is visible from the exterior, so that the user recognizes the occurrence of a document jam situation in the conveyance path 29.

Figure 4:
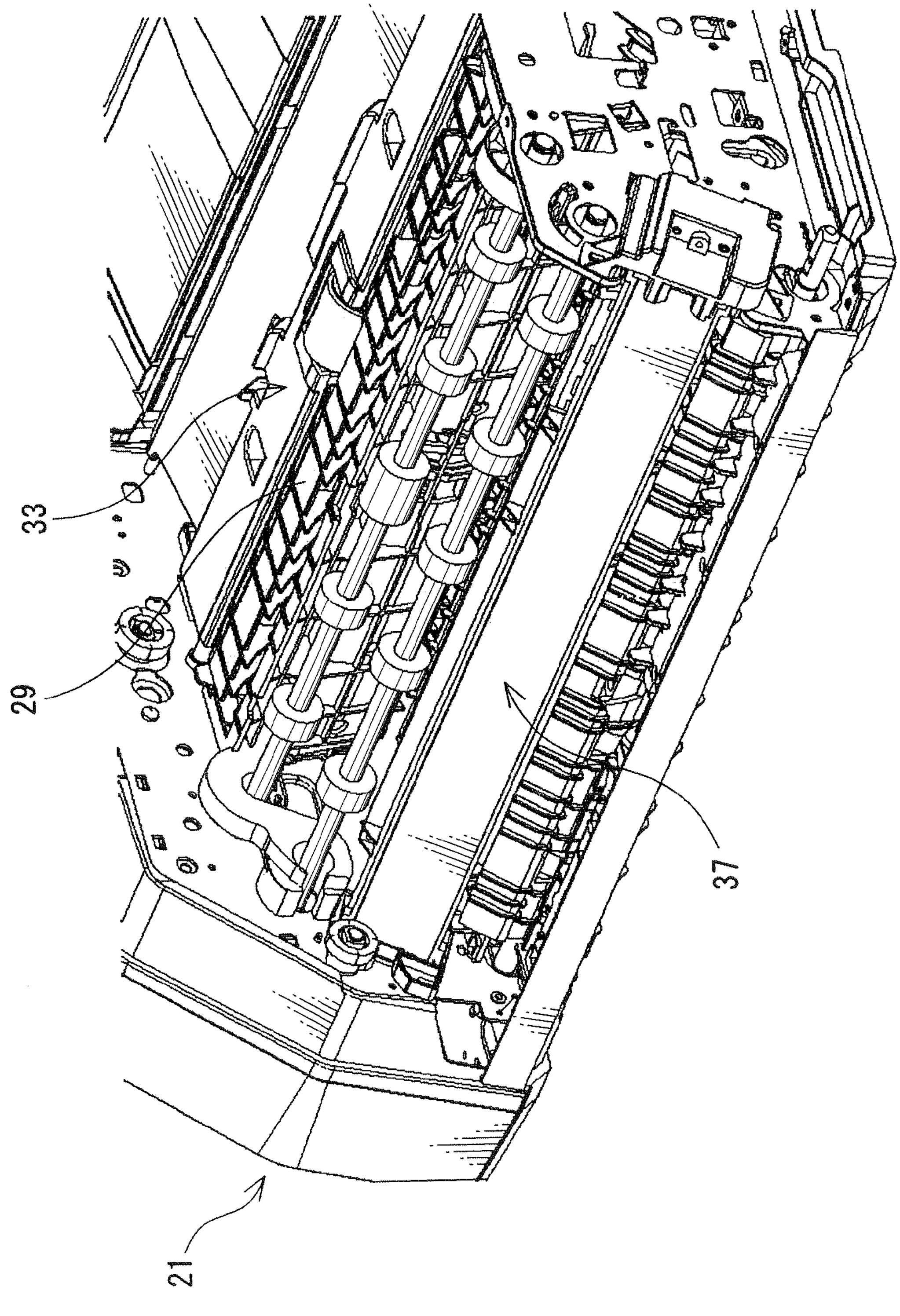
FIG. 4 is a perspective diagram of a document feeding device in a state where the conveyance guide has been removed.
Figure 5:
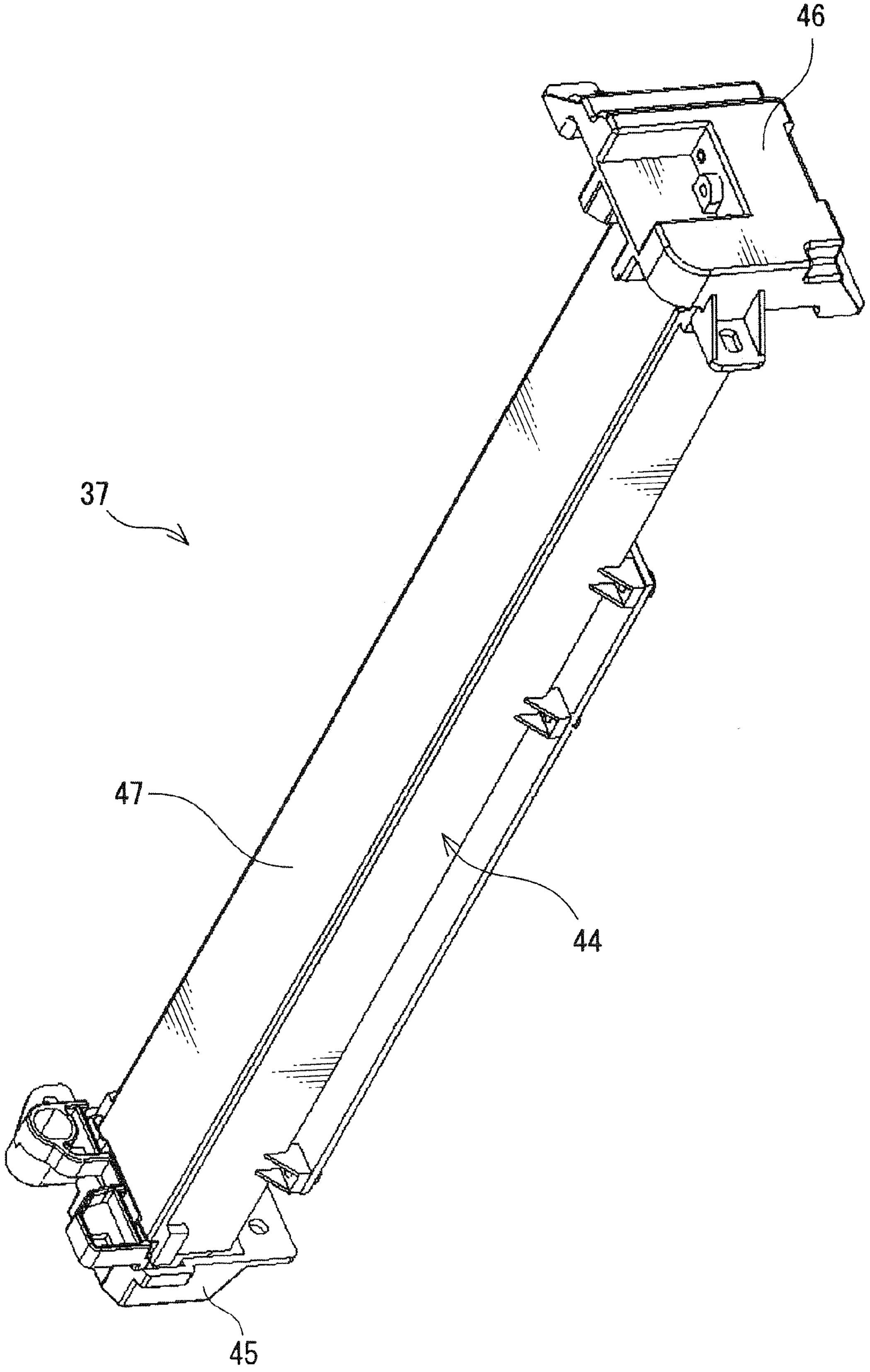
FIG. 5 is a perspective diagram of an illumination device provided in a document feeding device.

FIG. 4 is a perspective diagram of a document feeding device 20 in a state where the conveyance guide has been removed and FIG. 5 is a perspective diagram of the contact image sensor 37 described above, which functions as an illumination device for the conveyance path 29 in the event of a document jam. The contact image sensor 37 includes a square cylindrical main body section 44 which extends toward the rear surface side from the front surface side of the complex machine 1 and a reading surface 47 which is provided on one surface of the main body section 44. The end portions 45 and 46 of the main body section 44 are fixed to the feeding device main body 21. The reading surface 47 is disposed between these end portions 45 and 46 and is positioned opposing the conveyance path 29 at a position facing the reading roller 36 (see FIG. 3). By lighting up the reading surface 47, it is possible to illuminate the conveyance path 29.

Figure 6:
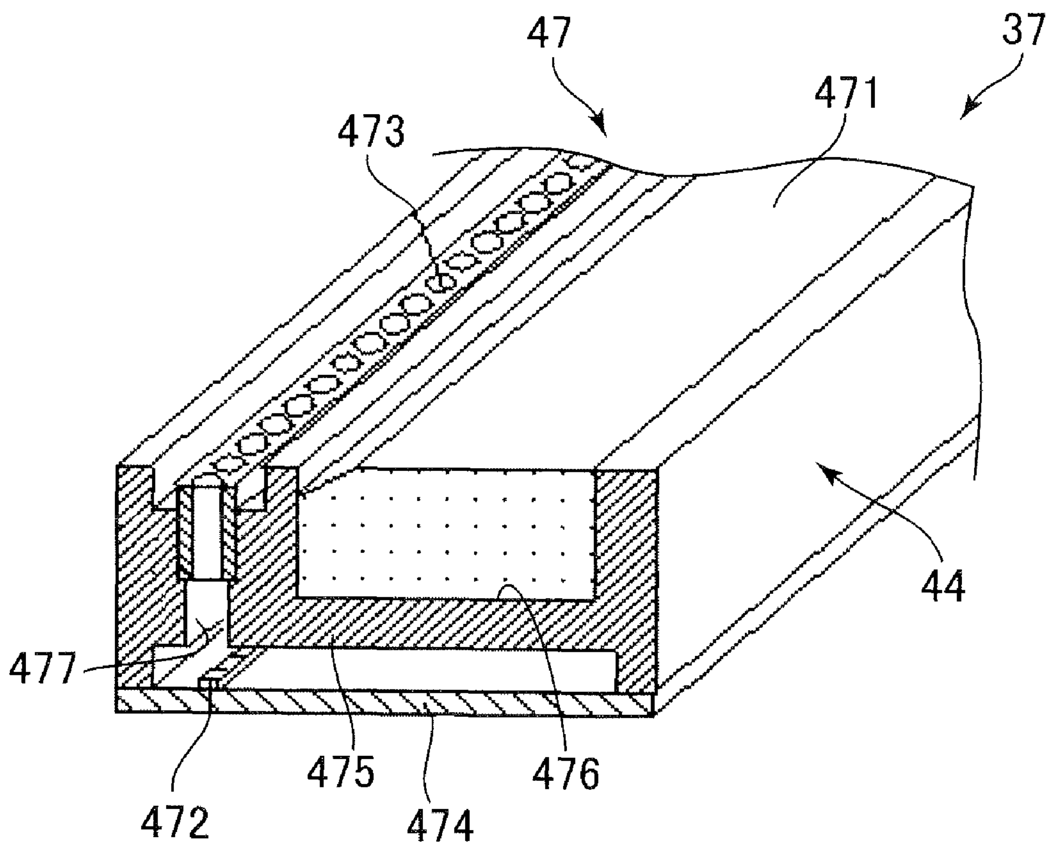
FIG. 6 is a cross-sectional perspective diagram of an illumination device.

FIG. 6 is a cross-sectional perspective diagram of the contact image sensor 37. The contact image sensor 37 includes an illumination member 471 which generates illumination light for illuminating the image surface of the original document passing through the conveyance path 29, a line CCD 472 (light receiving element) which receives illumination light that is reflected by the image surface, and a rod lens array 473 which guides the reflected light to the line CCD. The illumination member 471 consists of a transparent resin block into which an LED forming a light source is introduced, and has a long and narrow plate shape which extends in the breadthways direction of the original document. The line CCD 472 is a photoelectric transducer having image sensors arranged in a one-dimensional configuration, and generates analog image signal by photo-electrically converting the reflected light. The rod lens array 473 is an optical system which condenses the reflected light and guides same to the line CCD 472, and includes an array of a plurality of rod lenses.

A housing 475 which constitutes the main body section 44 includes a recess section 476 for holding the illumination member 471 and a slit section 477 for holding the rod lens array 473 and transmitting the reflected light. The printed substrate 474 is disposed on the rear surface side of the housing 475 and the line CCD 472 opposes the slit section 477.

Figure 7:
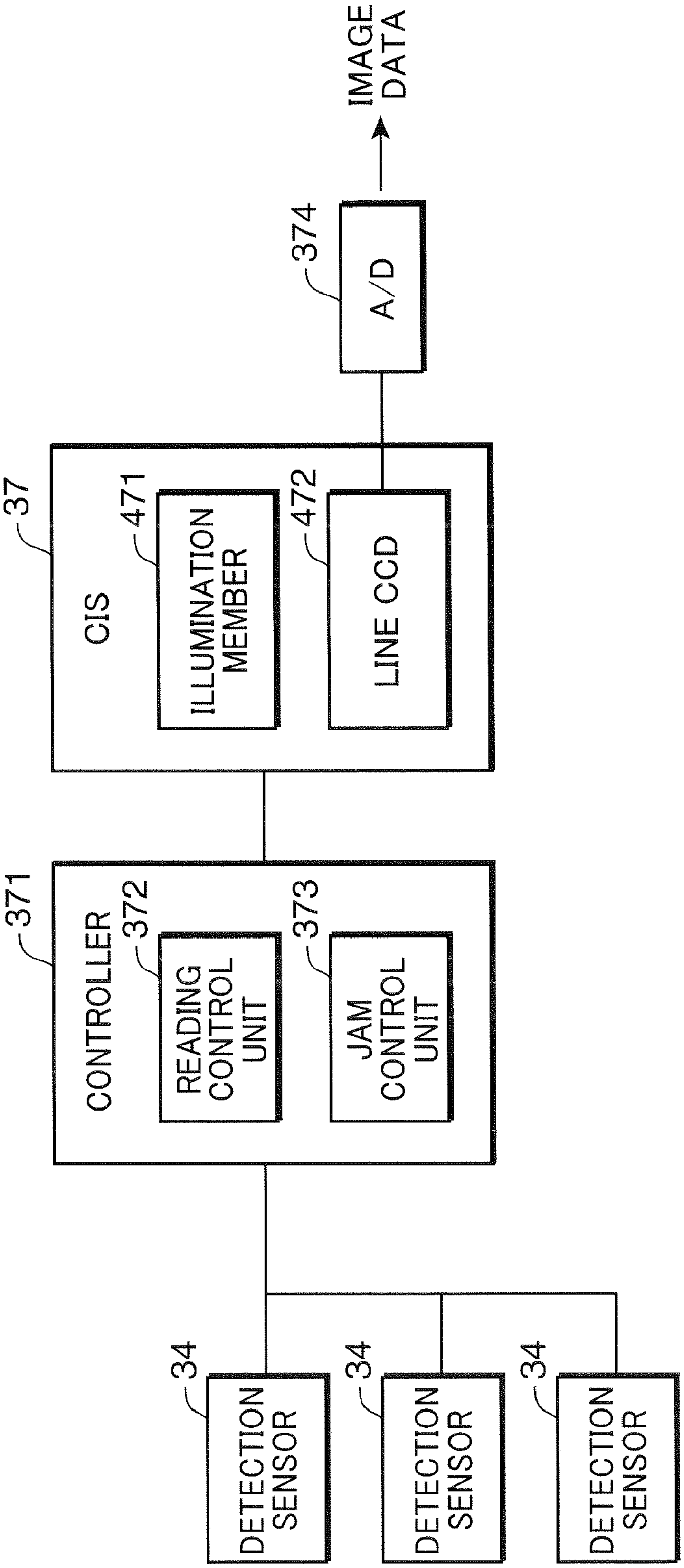
FIG. 7 is a block diagram showing the control composition of an illumination device.

FIG. 7 is a block diagram showing the control composition of the image contact sensor 37. The controller 371 includes a reading control unit 372 which functions during normal reading of a document, and a jam control unit 373 which functions in the event of a document jam.

Upon receiving an operating signal instructing image reading in a state where an original document has been positioned on the original document tray 22, the reading control unit 372 conveys the original document by driving the pick-up roller 30, the separating roller pair 33, the resist roller 35, and the like, as well as causing the contact image sensor 37 to perform an operation of reading the document image. In other words, the reading control unit 372 lights up the illuminating member 471 by supplying voltage thereto, thus irradiating light onto the image surface of the document, and also outputs an analogue electrical signal obtained by applying a timing pulse to the line CCD 472 and photo-electrically converting the reflected light. This analogue electrical signal is converted into digital image data by the A/D converter 374 and is input to the device main body 2 (light exposure unit 8).

If any one of the detection sensors 34 detects a document jam and the jam control unit 373 receives the corresponding detection signal, then the jam control unit 373 implements control so as to light up the illumination member 471 of the contact image sensor 37. During normal document reading, the illumination member 471 only lights up during the passage of the document, but in the event of a document jam, the illumination member 471 lights up continuously until processing of the jam has been completed, or until the user gives a switch off instruction or until a predetermined time period has elapsed. By this means, the reading surface 47 is illuminated and the conveyance path 29 is illuminated.

The situation of the conveyance path 29 under the illumination of the contact image sensor 37 can be seen from the exterior of the feeding device main body 21. More precisely, as shown in FIG. 2, a window section 27 into which is fitted a transparent or semi-transparent transmitting member 28 is provided in the front face side wall of the front side edge 201. When the reading surface 47 is lit up and the conveyance path 29 is illuminated, this illumination light leaks out from the window section 27. The front side edge 201 is the side edge facing the user when he or she operates the complex machine 1, and hence the user is able readily to see the occurrence of a document jam via the window section 27.

Next, the operation of the complex machine 1 will be described. When an original document has been set in the original document tray 22 of the document feeding device 20 and a prescribed button has been pressed, the original document is conveyed toward the first contact glass 40 (the image reading position) so that the document image is read and is discharged to the discharge tray 24. In the case of manual copying, a document is set on the second contact glass 41 and the original document image is read in by the image reading unit 7 in a state of being pressed by the pressing plate 43.

On the other hand, in the device main body 2, in parallel with the document reading operation described above, paper P is separated and conveyed one sheet at a time from the paper supply cassette 3 or manual feed tray 5 and this paper P arrives at the resist roller 17 inside the device main body 2. The resist roller 17 straightens any skewed travel of the paper as well as feeding the paper to the transfer unit 10 in synchronism with the image transfer timing of the toner image formed on the photosensitive drum 91.

Laser light L is irradiated by the light exposure unit 8 onto the circumferential surface of the photosensitive drum 91 on the basis of the image data obtained by the document reading operation. By this means, an electrostatic latent image of the document image is formed on the photosensitive drum 91 and this electrostatic latent image is subsequently developed by a developing unit 93. By means of this development, a toner image is formed on the circumferential surface of the photosensitive drum 91. This toner image is transferred to paper in the transfer unit 10.

Thereupon, the paper P is conveyed toward the fixing unit 12 in a state of carrying an unfixed toner image thereon, and the toner image is fixed to the paper P. The paper P which is discharged from the fixing unit 12 is discharged via the branching section 13 to a tray 14.

In contrast to this single-side printing, when carrying out double-side printing, the paper discharged from the fixing unit 12 is returned back to the double-side printing unit 16 immediately before being discharged to the tray 14. This paper converges with the conveyance path 4 and is conveyed again toward the transfer unit 10. In this case, a toner image is transferred onto the surface of the paper where printing has not yet been carried out.

As described above, according to the document feeding device 20 of the present embodiment, when an original document has been conveyed from the original document tray 22 toward the conveyance path 29 and the image surface thereof has been read by the image reading unit 7, the document is sent to the discharge tray 24. Here, the document feeding device 20 respectively includes a detection sensor 34 and a contact image sensor 37 in the conveyance path 29, and the detection sensor 34 detects a document jam in the conveyance path 29. If a document jam has been detected by the detection sensor 34, the contact image sensor 37 immediately shines onto the conveyance path 29.

In a conventional document feeding device, the contact image sensor does not light up immediately upon the occurrence of a document jam, but rather when the jam is subsequently processed, but in contrast to this, here a document jam situation can be reported immediately to the user. Furthermore, the contact image sensor 37 does not simply report the occurrence of a document jam, but also shines onto the conveyance path 29 in such a manner that the jam situation can be seen through the window section 27, and therefore a document jam situation is not liable to be left unattended.

Moreover, rather than providing a separate illumination device, the conveyance path 29 is illuminated by using the illumination member 471 that is provided in the contact image sensor 37 which has the function of reading the image surface. Consequently, it is possible to reduce the number of components, and this also contributes to reducing the space occupied by the document feeding device 20.

Furthermore, the feeding device main body 21 has a front surface side wall which is situated on the front side edge 201 that faces the user and the window section 27 is formed in this front surface side wall. The light emitted by the contact image sensor 37 is radiated from this window section 27. Therefore, the user is able to see the jammed state of the document from a position below the top surface of the document feeding device 20 or from a distant position, and hence the jammed state can be seen regardless of the user's age or restricted abilities. This corresponds to requirements for designs which can be used by a large variety of people (universal design). Furthermore, by informing a user easily and rapidly of the occurrence of a document jam, the idle time of the complex machine 1 becomes short and the reliability of the complex machine 1 also improves.

The present invention is not limited to the embodiment described above, and it is possible to implement various modifications without deviating from the claims. For example, it is also possible to provide a plurality of contact image sensors 37 as described above inside the feeding device main body 21, and it is also possible to form the paper supply cover 25 itself from a transparent or semi-transparent transmitting member. Alternatively, it is also possible to dispose a separate illumination device from the contact image sensor 37 inside the feed document main body 21.

Moreover, although an example in which the image forming device is realized as a complex machine was described in the embodiment given above, the present invention can of course also be applied to a copying machine, printer, or the like, which has a document feeding device.

The specific embodiment described above principally includes an invention having the following composition.

The document feeding device relating to one aspect of the present invention includes: an original document tray on which an original document is loaded; a discharge tray to which the original document is discharged; a conveyance path for conveying an original document on the original document tray to the discharge tray via an original document reading position; a detection unit which is disposed in the conveyance path and detects a jam of the original document in the conveyance path; and an illumination device which illuminates the conveyance path in a state visible from the exterior, when the detection unit has detected a jam of the original document.

According to this composition, an original document is conveyed from the original document tray toward the conveyance path and when the image surface thereof has been read, the document is sent to a discharge tray. Here, when the detection unit detects a document jam in the conveyance path, then the illumination device illuminates the conveyance path in a state that is visible from the exterior. Thereby, it is possible to inform a user immediately of a document jam situation, compared to the prior art. Furthermore, this illumination device does not only simply report the occurrence of a document jam, but also illuminates the conveyance path, and therefore a document jam situation is not liable to be left unattended.

In the composition described above, desirably, the illumination device is positioned opposing the conveyance path. According to this composition, it is possible to illuminate the conveyance path efficiently.

In the composition described above, desirably, a contact image sensor disposed in the document image reading position which optically reads in the image surface of the original document is also provided, and this contact image sensor comprises an illumination member which generates illumination light for illuminating the image surface and a light receiving element which receives reflected light of the illumination light, the illumination member being used as the illumination device. According to this composition, since the illumination member of the contact image sensor which is essentially disposed for reading the image surface is used, then the number of components can be reduced, thus contributing to reducing the space occupied by the document feeding device.

In the composition described above, desirably, a housing which covers the conveyance path is also provided, the housing has a window section, and when the illumination device illuminates the conveyance path, the illumination light leaks out from the window section. According to this composition, it is possible for the user readily to see the illumination light emitted by the illumination device.

In this case, desirably, the housing has a front surface side wall in a direction facing the user, and the window section is provided in the front surface side wall. In particular, desirably, the housing includes a housing main body and a conveyance guide which constitutes the upper surface of the conveyance path and is openable and closable with respect to the housing main body; and the window section is provided in the front surface side wall provided in the housing main body. According to this composition, since a window section is provided in the front surface side wall which faces the user, then the user is able to perceive the document jam situation even from a position below the top surface of the document feeding device or from a distant position. Consequently, it is possible to respond to requirements for universal design which can be used by a variety of people, irrespective of their age or whether or not they have restricted abilities.

The image reading device relating to a further aspect of the present invention includes: an image reading unit including a contact glass disposed on an original document reading position and a housing which holds the contact glass; and a document feeding device which is disposed above the image reading unit and which feeds an original document to the contact glass; the document feeding device having the composition described above.

The image forming device relating to yet a further aspect of the present invention includes: an image reading device which reads in an original document image; and a device main body which has an image forming unit that forms an image on paper on the basis of original document image data read in by the image reading device and which supports the image reading device. The image reading device includes: an image reading unit including a contact glass disposed on an original document reading position and a housing which holds the contact glass; and a document feeding device, which is disposed above the image reading unit, and feeds an original document to the contact glass; the document feeding device having the composition described above.

According to the image reading device or image forming device of this kind, by informing a user easily and rapidly of the occurrence of a document jam, the idle time of the complex machine becomes short and the reliability of the complex machine also improves.

This application is based on Japanese Patent Application Serial No. 2008-232611, filed in Japan Patent Office on Sep. 10, 2008 respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A document feeding device, comprising:

an original document tray on which an original document is loaded;

a discharge tray to which the original document is discharged;

a conveyance path for conveying an original document on the original document tray to the discharge tray via an original document reading position;

a housing that covers the conveyance path, the housing including a housing main body and a conveyance guide that constitutes an upper surface of the conveyance path, the conveyance guide being supported rotatably with respect to the housing main body by a rotational fulcrum provided at a side end of the housing main body so that the conveyance guide can be opened and closed with respect to the housing main body;

a detection unit which is disposed in the conveyance path and detects a jam of the original document in the conveyance path; and an illumination device disposed in proximity to the rotational fulcrum and illuminating the conveyance path at a position covered by the conveyance guide in a state visible from the exterior when the detection unit has detected a jam of the original document.

2. The document feeding device according to claim 1, wherein the illumination device is positioned opposing the conveyance path.

3. The document feeding device according to claim 1, further comprising:

a contact image sensor which is disposed in the original document reading position and optically reads an image surface of the original document, wherein the contact image sensor comprises an illumination member which generates illumination light that illuminates the image surface and a light receiving element which receives reflected light of the illumination light, and the illumination member is used as the illumination device.

4. The document feeding device according to claim 1, further comprising: a housing which covers the conveyance path wherein the housing has a window section, and when the illumination device illuminates the conveyance path, the illumination light leaks out from the window section.

5. The document feeding device according to claim 4, wherein the housing has a front-surface-side wall in a direction facing a user, and the window section is provided in the front-surface-side wall.

6. An image reading device which reads an original document image, comprising:

an image reading unit including a contact glass disposed on an original document reading position and a housing which holds the contact glass; and a document feeding device which is disposed above the image reading unit and feeds an original document to the contact glass, wherein the document feeding device includes:

an original document tray on which an original document is loaded;

a discharge tray to which the original document is discharged;

a conveyance path which conveys an original document on the original document tray to the discharge tray via the original document reading position;

a housing that covers the conveyance path, the housing including a housing main body and a conveyance guide that constitutes an upper surface of the conveyance path, the conveyance guide being supported rotatably with respect to the housing main body by a rotational fulcrum provided at a side end of the housing main body so that the conveyance guide can be opened and closed with respect to the housing main body;

a detection unit which is disposed in the conveyance path and detects a jam of the original document in the conveyance path; and an illumination device disposed in proximity to the rotational fulcrum and illuminating the conveyance path at a position covered by the conveyance guide in a state visible from the exterior when the detection unit has detected a jam of the original document.

7. An image forming device, comprising:

an image reading device which reads in an original document image; and a device main body which has an image forming unit that forms an image on sheet on the basis of original document image data read by the image reading device, and which supports the image reading device, wherein the image reading device comprises:

an image reading unit including a contact glass disposed on an original document reading position and a housing which holds the contact glass; and a document feeding device which is disposed above the image reading unit and feeds an original document to the contact glass, and wherein the document feeding device includes:

an original document tray on which an original document is loaded;

a discharge tray to which the original document is discharge;

a conveyance path which conveys an original document on the original document tray to the discharge tray via the original document reading position;

a housing that covers the conveyance path, the housing including a housing main body and a conveyance guide that constitutes an upper surface of the conveyance path, the conveyance guide being supported rotatably with respect to the housing main body by a rotational fulcrum provided at a side end of the housing main body so that the conveyance guide can be opened and closed with respect to the housing main body;

a detection unit which is disposed in the conveyance path and detects a jam of the original document in the conveyance path; and an illumination device disposed in proximity to the rotational fulcrum and illuminating the conveyance path at a position covered by the conveyance guide in a state visible from the exterior, when the detection unit has detected a jam of the original document.

8. A document feeding device, comprising:

an original document tray on which an original document is loaded;

a discharge tray to which the original document is discharged;

a conveyance path for conveying an original document on the original document tray to the discharge tray via an original document reading position;

a housing that covers the conveyance path;

a detection unit which is disposed in the conveyance path and detects a jam of the original document in the conveyance path;

an illumination device which illuminates the conveyance path in a state visible from the exterior, when the detection unit has detected a jam of the original document; and a window section in the housing and disposed so that illumination from the illumination device leaks out from the window section when the illumination device illuminates the conveyance path.

9. The document feeding device according to claim 8, wherein the housing has a front-surface-side wall in a direction facing a user, and the window section is provided in the front-surface-side wall.

10. The document feeding device according to claim 9, wherein the housing includes a housing main body and a conveyance guide which constitutes the upper surface of the conveyance path and can be opened and closed with respect to the housing main body; and the window section is provided in the front-surface-side wall provided in the housing main body.

* * * * *